(12) United States Patent
Yu et al.

(10) Patent No.: US 9,953,212 B2
(45) Date of Patent: Apr. 24, 2018

(54) METHOD AND APPARATUS FOR ALBUM DISPLAY, AND STORAGE MEDIUM

(71) Applicant: Xiaomi Inc., Beijing (CN)

(72) Inventors: Jun Yu, Beijing (CN); Heng Wang, Beijing (CN); Jingwei Cai, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/093,210

(22) Filed: Apr. 7, 2016

(65) Prior Publication Data
US 2016/0300101 A1    Oct. 13, 2016

(30) Foreign Application Priority Data
Apr. 8, 2015    (CN) .......................... 2015 1 0164076

(51) Int. Cl.
*G06K 9/00* (2006.01)
*G06F 17/30* (2006.01)
*G06K 9/62* (2006.01)

(52) U.S. Cl.
CPC ..... *G06K 9/00288* (2013.01); *G06F 17/3028* (2013.01); *G06F 17/30247* (2013.01); *G06F 17/30274* (2013.01); *G06K 9/6218* (2013.01)

(58) Field of Classification Search
CPC combination set(s) only.
See application file for complete search history.

(56) References Cited

U.S. PATENT DOCUMENTS

| 7,796,779 | B1 * | 9/2010 | Strong | ................... G06T 11/60 345/619 |
| 2003/0128877 | A1 * | 7/2003 | Nicponski | ............ G06K 9/6269 382/224 |

(Continued)

FOREIGN PATENT DOCUMENTS

| CN | 102682111 A | 9/2012 |
| CN | 103369031 A | 10/2013 |

(Continued)

OTHER PUBLICATIONS

English translation of International Search Report dated Feb. 18, 2016 for International Application No. PCT/CN2015/095185, 2 pages.

(Continued)

*Primary Examiner* — Alex Liew
(74) *Attorney, Agent, or Firm* — Brinks, Gilson & Lione

(57) ABSTRACT

The present disclosure relates to an album display method, an album display apparatus and a storage medium, which pertain to the graphics and image technical field. The method includes: uploading a plurality of photographs stored in the smart device to a server, receiving face identification information for at least two of the plurality of photographs from the server, wherein the at least two photographs are identified to include faces by the server using a face recognition algorithm, the face identification information includes a photograph identifier and an album identifier for one of a plurality of face albums, and the plurality of face albums are generated by grouping the at least two photographs based on faces identified in the at least two photographs, adding the at least two photographs to their corresponding face albums based on the face identification information, and displaying the plurality of face albums. By clustering photographs based on faces in the photographs to obtain different face albums, the present (Continued)

disclosure enables photographs in a mobile terminal to be managed and displayed according to different faces. Accordingly, the problem in related techniques that an album program manages and displays photographs solely depending on sources, times or places of the pictures is addressed, and the effect that the album program could manage and display photographs according to faces is achieved.

15 Claims, 15 Drawing Sheets

(56) References Cited

U.S. PATENT DOCUMENTS

| | | | |
|---|---|---|---|
| 2006/0078201 | A1 | 4/2006 | Kim et al. |
| 2008/0298766 | A1 | 12/2008 | Wen et al. |
| 2011/0123071 | A1* | 5/2011 | Shah ............... G06K 9/00288 382/118 |
| 2012/0148120 | A1 | 6/2012 | Yagi et al. |
| 2013/0308864 | A1 | 11/2013 | Naito et al. |
| 2014/0348398 | A1 | 11/2014 | Irimoto |
| 2015/0026209 | A1 | 1/2015 | Xiang |
| 2015/0085146 | A1 | 3/2015 | Khemkar |
| 2015/0373404 | A1 | 12/2015 | Fukazawa et al. |

FOREIGN PATENT DOCUMENTS

| | | |
|---|---|---|
| CN | 104168378 A | 11/2014 |
| CN | 104284252 A | 1/2015 |
| CN | 104820675 A | 8/2015 |
| JP | 2007-11777 A | 1/2007 |
| JP | 2010-182308 A | 8/2010 |
| JP | 2011-44044 A | 3/2011 |
| JP | 2014-139733 A | 7/2014 |
| JP | 2014-229178 A | 12/2014 |
| JP | 2015-41234 A | 3/2015 |
| KR | 10-2006-0048225 A | 5/2006 |
| KR | 10-1479260 B1 | 1/2015 |
| RU | 2 345 414 C1 | 1/2009 |
| WO | WO 2016/006090 A1 | 1/2016 |

OTHER PUBLICATIONS

Extended European Search Report dated Sep. 5, 2016 for European Application No. 16163582.6, 7 pages.
International Search Report dated Feb. 18, 2016 for International Application No. PCT/CN2015/095185, 14 pages.
Office Action dated Jul. 4, 2017 for Japanese Application No. 2016-515944, 10 pages.
Office Action dated Jul. 27, 2017 for Korean Application No. 10-2016-7007569, 4 pages.
Office Action dated Jun. 28, 217 for Russian Application No. 2016126469/08, 6 pages.
Examination Report dated Sep. 1, 2017 for European Application No. 16163582.6, 5 pages.
International Preliminary Report on Patentability dated Oct. 19, 2017 for International Application No. PCT/CN2015/095185, 9 pages.

* cited by examiner

METHOD AND APPARATUS FOR ALBUM DISPLAY, AND STORAGE MEDIUM

CROSS REFERENCE TO RELATED APPLICATION

The present application is based on and claims the benefit of priority from the Chinese patent application No. 201510164076.2 filed on Apr. 8, 2015, which is incorporated herein by reference in its entirety.

TECHNICAL FIELD

The instant disclosure relates to the graphics and image technical field and, more particularly, to album display methods and apparatus, and a storage medium.

BACKGROUND

The album program is one of the most commonly-used programs on mobile terminals, such as smartphones, tablet PCs and the like. The album program is applied for managing and displaying pictures in mobile terminals.

At present, pictures are classified by the album program in a mobile phone into different albums according to respective different sources of the pictures. For example, captured pictures are classified into one album, pictures from program A are classified into other album, and pictures from program B are classified into another album. In each album, pictures are ordered by time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure provides an album display method and apparatus, and a storage medium.

In a first aspect of embodiments of the present disclosure, an album display method is provided. The method includes uploading a plurality of photographs stored in the smart device to a server, receiving face identification information for at least two of the plurality of photographs from the server, wherein the at least two photographs are identified to include faces by the server using a face recognition algorithm, the face identification information includes a photograph identifier and an album identifier for one of a plurality of face albums, and the plurality of face albums are generated by grouping the at least two photographs based on faces identified in the at least two photographs, adding the at least two photographs to their corresponding face album based on the face identification information, and displaying the plurality of face albums.

According to a second aspect of embodiments of the present disclosure, an album display apparatus is provided, including an acquiring module configured to obtain face identification information of a plurality of photographs from a server, wherein the face identification information includes photograph identifiers and album identifiers of one or more face albums the photographs belong to, the face albums the photographs belong to being obtained by clustering the photographs based on similarity of faces in the photographs, an adding module configured to add the plurality of photographs to their corresponding face albums respectively according to the album identifier each photograph corresponds to, a display module configured to display the face albums.

According to a third aspect of the present disclosure, an album display apparatus is provided, including a processor, and a memory for storing commands executable by the processor to: upload a plurality of photographs stored in the album display apparatus to a server, receive the face identification information for at least two of the plurality of photographs from the server, wherein the at least two photographs are identified to include faces by the server using a face recognition algorithm, the face identification information includes a photograph identifier and an album identifier for one of a plurality of face albums, and the plurality of face albums are generated by grouping the at least two photographs based on faces identified in the at least two photographs, add the at least two photographs to their corresponding face albums based on the face identification information, and display the plurality of face albums.

According to a fourth aspect of the embodiments of the present disclosure, there is provided anon-transitory computer-readable storage medium having stored therein instructions that, when executed by a processor of a mobile terminal, causes the mobile terminal to perform an album display method, the method including uploading a plurality of photographs stored in the smart device to a server, receiving face identification information for at least two of the plurality of photographs from the server, wherein the at least two photographs are identified to include faces by the server using a face recognition algorithm, the face identification information includes a photograph identifier and an album identifier for one of a plurality of face albums, and the plurality of face albums are generated by grouping the at least two photographs based on similarity of faces identified in the at least two photographs, adding the at least two photographs to their corresponding face albums based on the face identification information, and displaying the plurality of face albums.

The technical solutions provided by the embodiments of the instant disclosure have advantageous effects as below.

By clustering photographs according to faces in the photographs to obtain different face albums, photographs in a mobile terminal can be managed and displayed according to different faces. As such, the problem in related techniques that an album program manages and displays photographs merely depending on sources, times or places of the pictures is addressed, and the effect that the album program could manage and display photographs according to faces is achieved.

It is understandable that the above general description and the following detailed description are just illustrative and the disclosure is not limited thereto.

BRIEF DESCRIPTION OF DRAWINGS

The drawings herein are incorporated into the description to constitute a part of the description, which illustrates the embodiments for the present disclosure, and together with the description, explains the principles of the instant disclosure.

DETAILED DESCRIPTION OF THE DISCLOSURE

Here, detailed description will be given of exemplary embodiments, which are illustrated in the accompanying drawings. In the following description, when the accompanying drawings are referred to, like numbers in different drawings represent like elements unless otherwise specified. Implementations described in the following exemplary embodiments are not all possible implementations according to the disclosure. Instead, they are merely examples of devices and methods according to certain aspects of the disclosure as recited in the appended claims.

Mobile terminals herein can be mobile phones, tablet PCs, electric readers, MP3 (Moving Picture Experts Group Audio Layer III) players, MP4 (Moving Picture Experts Group Audio Layer IV) players, portable laptop computers, desktop computers, etc.

Figure 1:
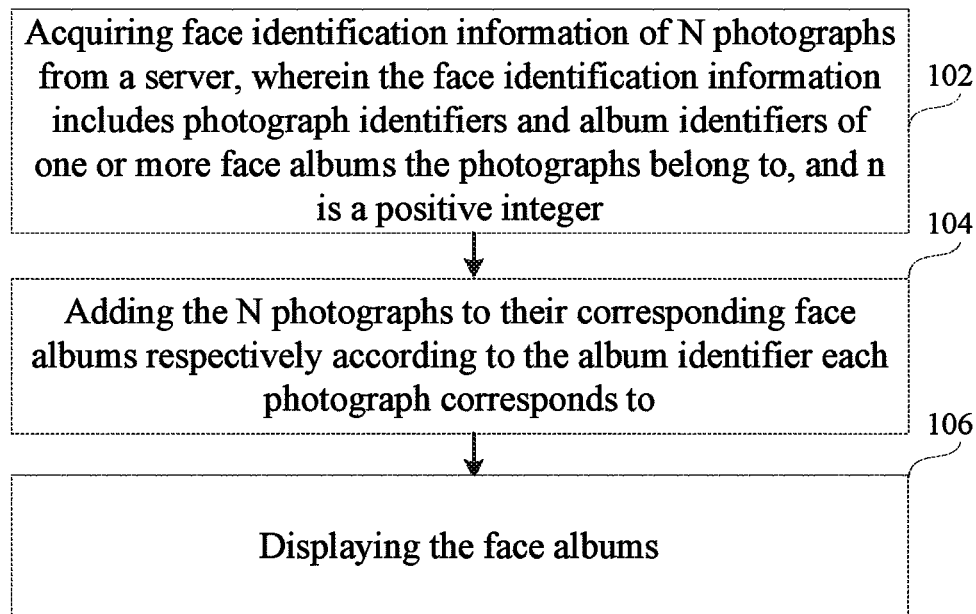
FIG. 1 is a flowchart of an album display method according to one exemplary embodiment.

FIG. 1 is a flowchart of an album display method according to one exemplary embodiment. The embodiment is illustrated by taking an example of applying the album display method to a mobile terminal. The method includes the following steps.

In Step 102, face identification information of N photographs is acquired from the server. The face identification information includes photograph identifiers and album identifiers of one or more face albums the photographs belong to. N is a positive integer.

A photograph identifier is an identifier which distinguishes a photograph from others. The photograph identifier of each photograph is unique among all the photograph identifiers. An album identifier is an identifier which distinguishes a face album from others. Each album identifier is unique among all the album identifiers.

A face album is obtained through clustering photographs based on similarity of faces in the photographs by the server. In other words, a number of photographs whose face similarity exceeds a threshold will be clustered into one face album.

In Step 104, the N photographs are added into their corresponding face albums respectively according to the album identifier each photograph corresponds to. With respect to each album identifier, if there is already a face album corresponding to the album identifier in the mobile terminal, the photograph is directly added into the face album. If not, a face album is generated based on the album identifier, and the photograph is added into the face album.

In Step 106, the face albums are displayed.

To sum up, by clustering photographs based on faces in the photographs to obtain different face albums, the album display method in this embodiment enables photographs in the mobile terminal to be managed and displayed according to different faces. Accordingly, the problem in related techniques that an album program manages and displays photographs solely depending on sources, times or places of the pictures is solved, and the effect that the album program could manage and display photographs according to faces is achieved.

Figure 2A:
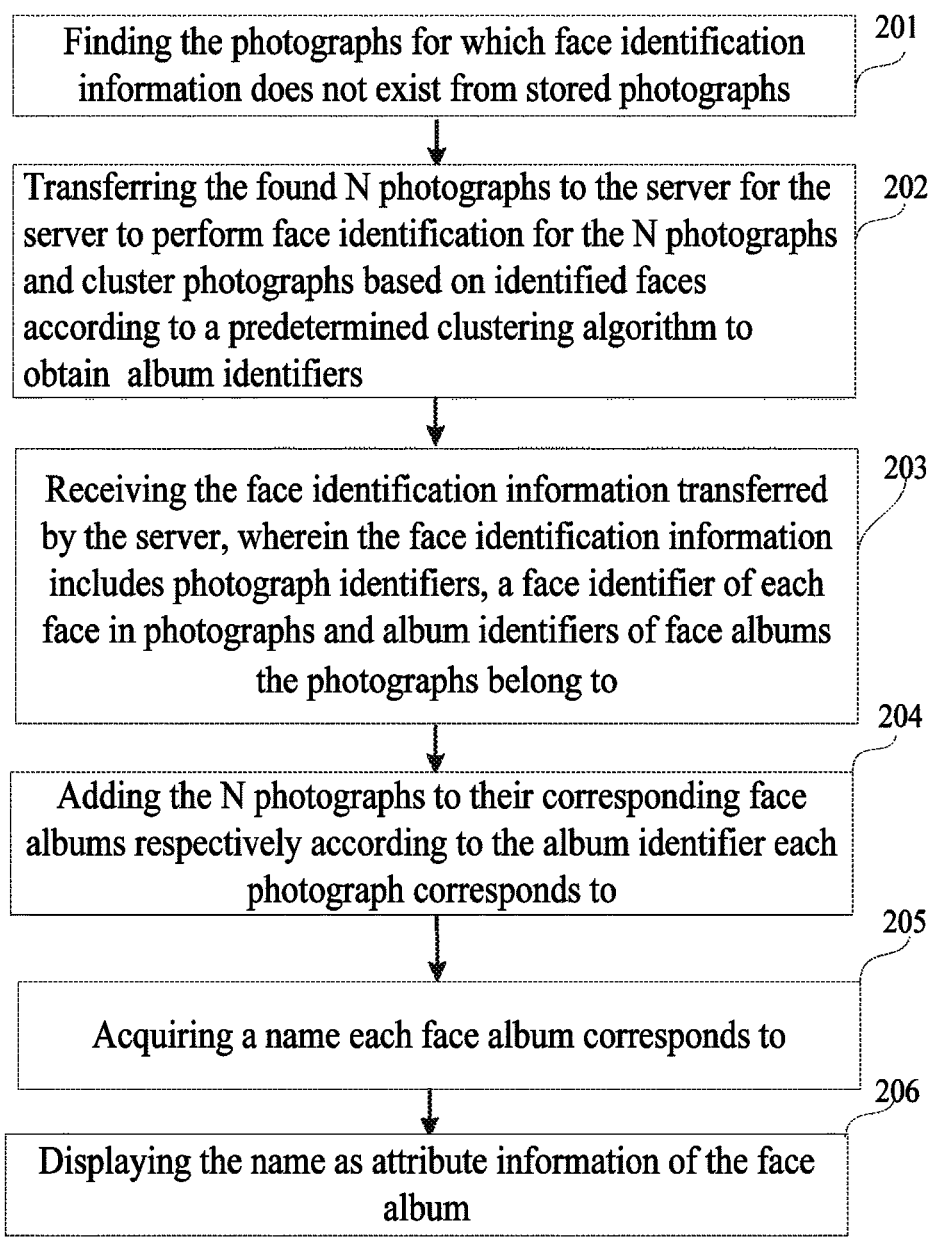
FIG. 2A is a flowchart of the album display method according to another exemplary embodiment.

FIG. 2A is a flowchart of an album display method according to another exemplary embodiment. Again, the present embodiment is illustrated by taking an example of applying the album display method to a mobile terminal. The method includes the following steps.

In Step 201, photographs for which face identification information does not exist are found from stored photographs. The number of photographs at the mobile terminal will gradually increase as the user continuously uses the mobile terminal. The mobile terminal find photographs for which face identifiers do not exist from locally stored photographs at a predetermined time interval, or at an idle period of the processor, or each time the photographing program is closed after being used. For example, the mobile terminal finds photographs for which face identifiers do not exist from the locally stored photographs at 11:00 every night.

In Step 202, the found N photographs are transferred to the server, and then the server performs face identification for the N photographs and clusters the photographs based on the identified faces according to a predetermined clustering algorithm, so as to obtain album identifiers.

After finding out N photographs for which face identification information does not exist, the mobile terminal transfers the N photographs to the server. Correspondingly, the server receives the N photographs and performs face identification for each of the N photographs to obtain a face in the photograph. Optionally, the face is represented by a face identifier and face characteristic information. Then, the photograph is clustered based on the identified face according to the predetermined clustering algorithm to obtain the face album the photograph belongs to and the album identifier of the face album.

Figure 2B:
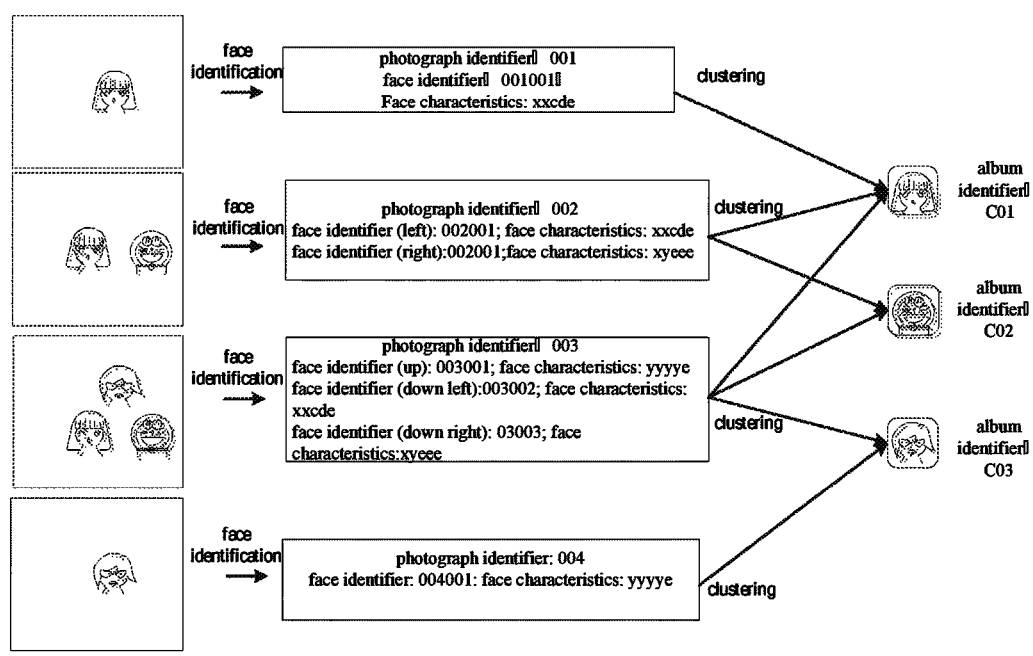
FIG. 2B is a schematic diagram illustrating the principle of the album display method according to the exemplary embodiment illustrated by FIG. 2A.

The procedure of processing the photographs by the server is illustrated in FIG. 2B. A face identifier is an identifier distinguishing a face from others. Various faces in the same photograph have different face identifiers. Additionally, the same person may have different faces for two captures, in size, color and lightness, so it is optional that the same person's faces in different photographs have different face identifiers, that is to say, each face in each photograph has a unique face identifier.

One photograph may correspond to one photograph identifier. In other example, one photograph may correspond to N face identifiers, with N being a positive integer. That is, one photograph contains N faces which correspond to N face identifiers. Thus, one photograph corresponds to N album identifiers. Without considering combination of albums, each face identifier in one photograph corresponds to one face album, namely, each face identifier corresponds to one album identifier.

In Step 203, the face identification information transferred by the server is received. The face identification information includes photograph identifiers, a face identifier of each face in the photographs and the album identifiers of the face albums the photographs belong to. The face albums the photographs belong to are obtained through clustering the photographs by the server based on similarity of faces in the photographs, and N is a positive integer.

The mobile terminal receives the face identification information of the N photographs transferred by the server. The face identification information comprises photograph identifiers, a face identifier of each face in photographs, and album identifiers of face albums the photograph belongs to.

Optionally, the face identification information may include location information of each face in the photographs.

With reference to FIG. 2B, exemplary face identification information is shown in table 1 as below.

TABLE 1

| Photograph Identifier | Face Identifier | Album Identifier |
|---|---|---|
| 001 | 001001 | C01 |
| 002 | 002001 | C01 |
|  | 002002 | C02 |
| 003 | 003001 | C03 |
|  | 003002 | C01 |
|  | 003003 | C01 |
| 004 | 004001 | C03 |

In Step 204, the N photographs are added to their corresponding face albums respectively according to the album identifier which each photograph corresponds to. For example, according to the face identification information, the mobile terminal adds photograph 001 into face album C01, photograph 002 into face album C01 and face album C02, photograph 003 into face album C01, face album C02 and face album C03, and photograph 004 into face album C03.

It shall be noted that if the mobile terminal already has the face album corresponding to the album identifier, the photograph is directly added into the face album. If the mobile terminal does not have the face album corresponding to the album identifier, a new face album needs to be established according to the album identifier, and then the photograph is added into the face album.

In Step 205, a name which each face album corresponds to is obtained. Each face album may correspond to one name. However, the same name may correspond to a plurality of face albums, because different persons may have the same name. The mobile terminal can receive the name input by the user for each face album.

In Step 206, the name is displayed as attribute information of the face album. The mobile terminal displays the name each face album corresponds to as the attribute information of the face album when displaying the face album. The attribute information can be an album name, and various face albums can be displayed as picture folders each of which may be provided with a cover photograph.

When the face album is a new established one, default album names can be adopted by the mobile terminal, such as "new face 1", "new face 2", "unknown person 1", "unknown person 2", "stranger 1", and "new face album2010303".

Figure 2C:
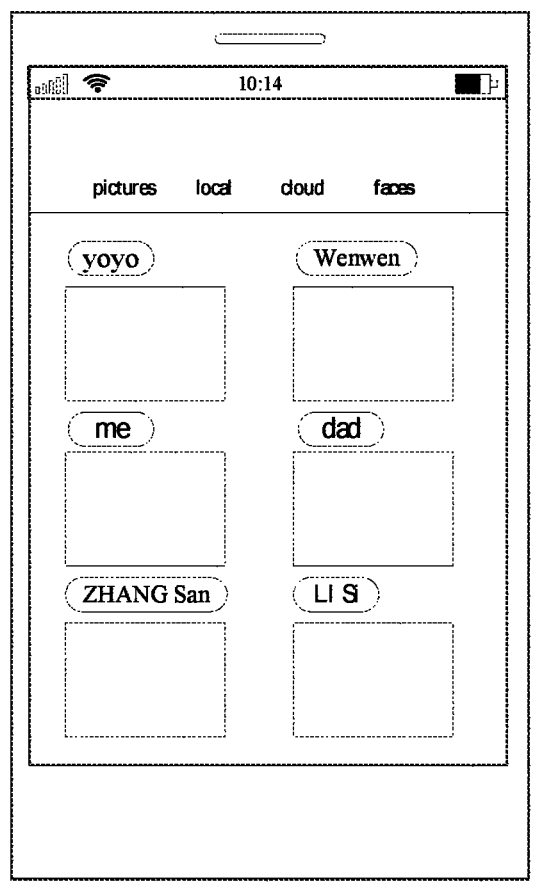
FIG. 2C is a diagram illustrating an interface of the album display method according to the exemplary embodiment illustrated by FIG. 2A.

For example, referring to FIG. 2C, the mobile terminal displays the name each face album corresponds to as the album name of the face album. The face album can coexist with other display modes as a new display mode.

To sum up, by clustering photographs based on faces in the photographs to obtain different face albums, the album display method in this embodiment enables photographs in the mobile terminal to be managed and displayed according to different faces. Accordingly, the problem in related techniques that album program manages and displays photographs solely depending on sources, times or places of the pictures, and the effect that the album program could manage and display photographs according to faces is achieved.

Optionally, the mobile terminal generates operation information according to a deleting operation or an adding operation performed by the user with respect to the photographs in the face album, and transfers the operation information to the server. The server adjusts the predetermined clustering algorithm according to the operation information. That is to say, the predetermined clustering algorithm is a self-learning algorithm which performs clustering based on a sample learning process, being capable of continuously optimizing the predetermined clustering algorithm by using the operation information generated while the user uses the mobile terminal.

Figure 3A:
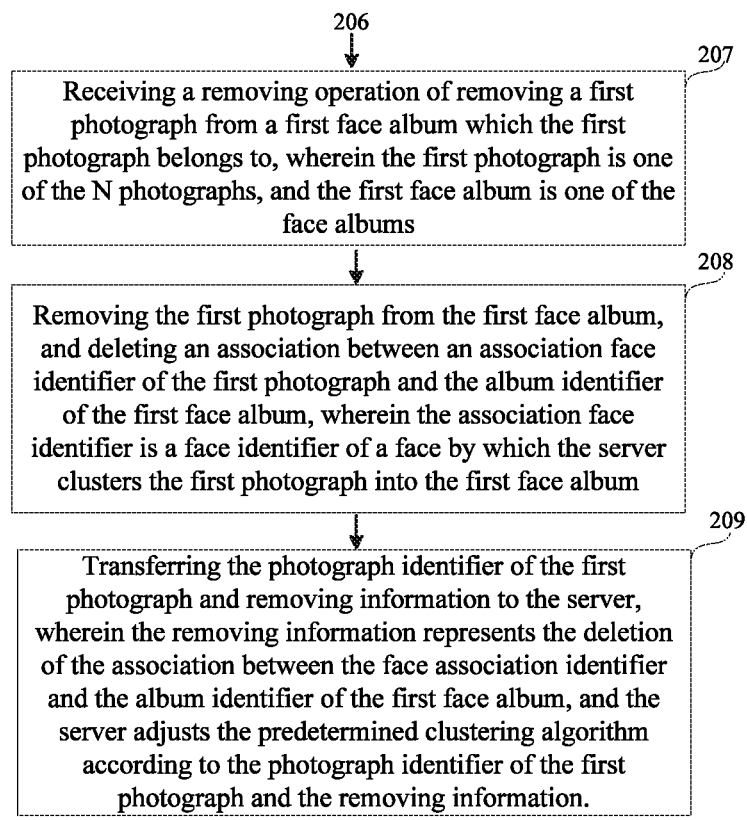
FIG. 3A is a flowchart of an album display method according to another exemplary embodiment.

As a possible implementation, the following steps are executed after step 206, as shown in FIG. 3A.

In Step 207, a first photograph is removed from a first face album the first photograph belongs to. The first photograph is one of the N photographs, and the first face album is one of the face albums.

In Step 208, the first photograph is removed from the first face album, and an association between an association face identifier of the first photograph and an album identifier of the first face album is removed. The association face identifier is a face identifier of a face by which the server clusters the first photograph into the first face album.

In Step 209, a photograph identifier of the first photograph and removing information are transferred to the server. The removing information represents the deletion of the association between the association face identifier and the album identifier of the first face album, and the server adjusts the predetermined clustering algorithm according to the photograph identifier of the first photograph and the removing information.

Figure 3B:
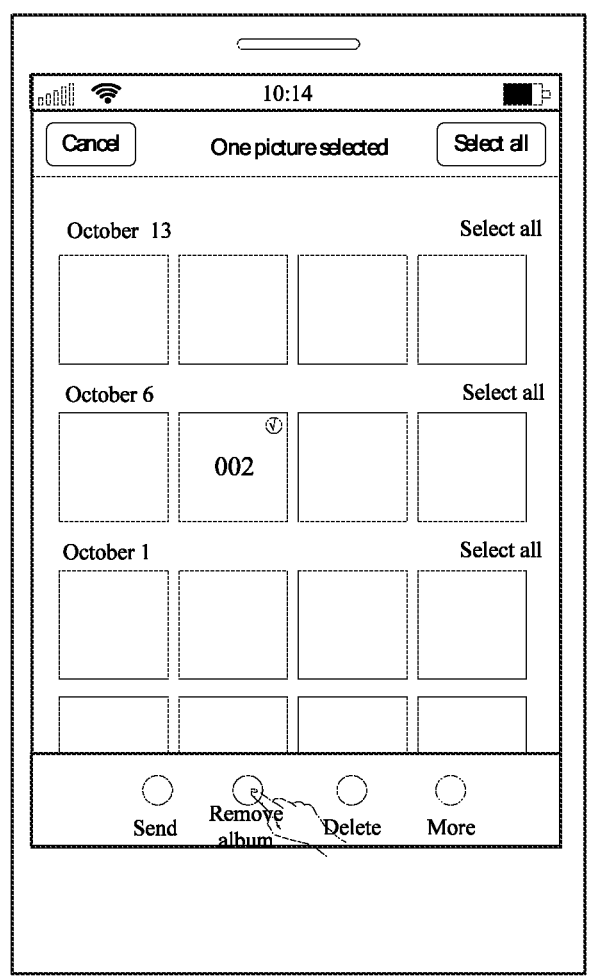
FIG. 3B is a diagram illustrating an interface of the album display method according to the exemplary embodiment illustrated by FIG. 3A.

For example, with reference to FIG. 3B, when the user finds that photograph 002 should not belong to the present face album, the user's deleting operation of deleting photograph 002 from the present face album is then received by the mobile terminal. The mobile terminal deletes photograph 002 from the face album C01 as well as the association between the face identifier 002001 in the face identification information and the album identifier C01, and then transfers the photograph identifier of photograph 002 and deleting information to the server, such that the server could adjust the predetermined clustering algorithm according to the photograph identifier and the deleting information.

Figure 4A:
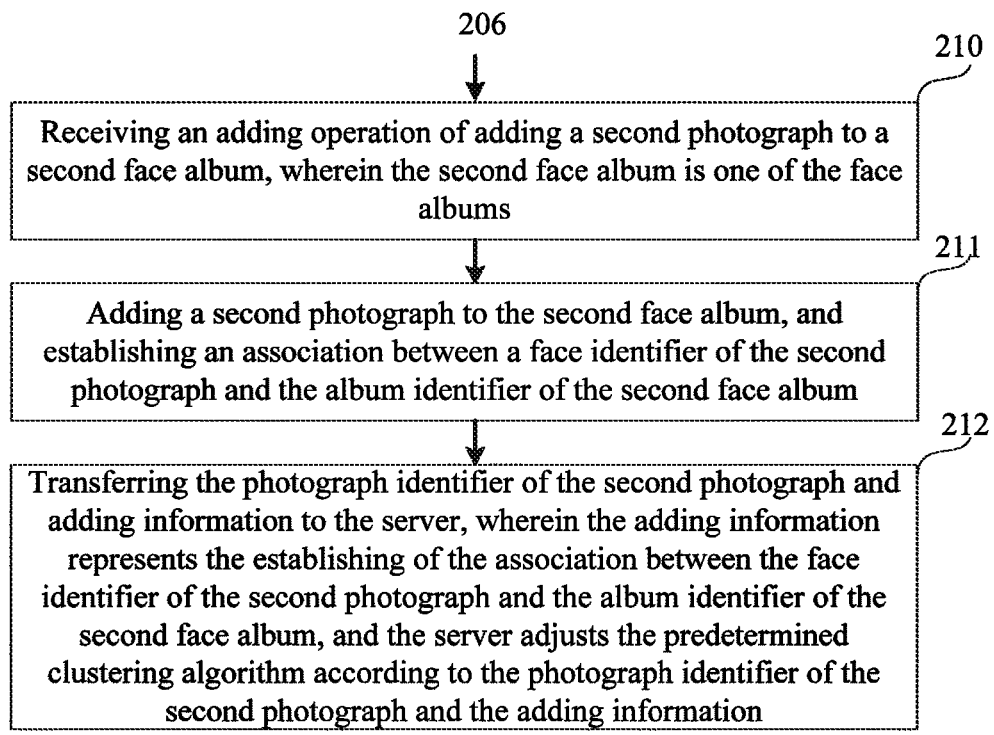
FIG. 4A is a flowchart of an album display method according to another exemplary embodiment.

As another possible implementation, the following steps are executed after step 206, as shown in FIG. 4A.

In Step 210, an adding operation of adding a second photograph to a second face album is received. The second face album is one of the face albums.

In Step 211, the second photograph is added to the second face album, and an association between face identifier of the second photograph and an album identifier of the second face album is established.

In Step 212, a photograph identifier of the second photograph and adding information are transferred to the server. The adding information represents the establishing of the association between the face identifier of the second photograph and the album identifier of the second face album, and the server adjusts the predetermined clustering algorithm according to the photograph identifier of the second photograph and the adding information.

Figure 4B:
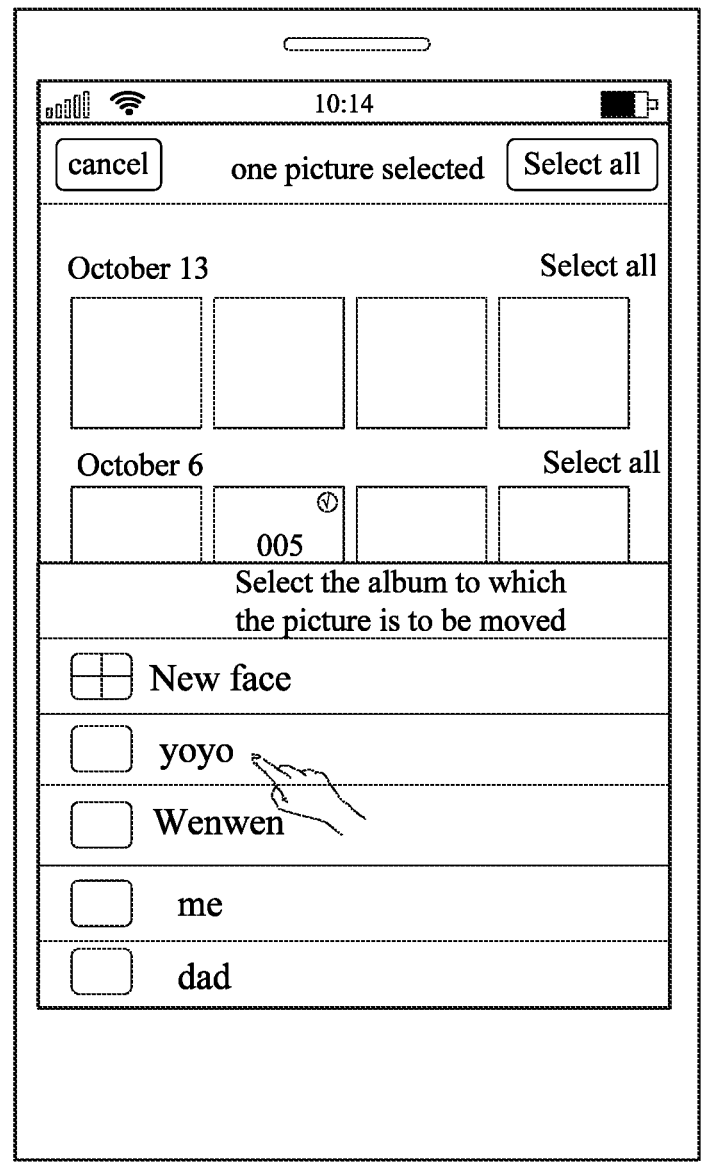
FIG. 4B is a diagram illustrating an interface of the album display method according to the exemplary embodiment illustrated by FIG. 4A.

For example, as shown in FIG. 4B, when the user finds that photograph 005 should belong to face album yoyo, an adding operation of adding photograph 005 to face album yoyo is received by the mobile terminal. The mobile terminal adds photograph 005 to face album yoyo and establishes an association between the face identifier 005001 of photograph 005 and the album identifier, and then transfers the photograph identifier of photograph 005 and adding information to the server, such that the server could adjust the predetermined clustering algorithm according to the photograph identifier of photograph 005 and the adding information.

In a possible case, there is no face identification information for the second photograph yet. Then, the mobile terminal transfers the second photograph and the album identifier of the second face album to the server, such that the server could adjust the predetermined clustering algorithm according to the second photograph and the album identifier of the second face album.

To sum up, compared with dedicatedly marking samples manually in relevant techniques, the album display method provided in the embodiment utilizes the operation information generated during normal use of the mobile terminal by the user. This improves the clustering accuracy of the predetermined clustering algorithm without increasing operation burden on the user, while reducing the workload of manually marking samples as far as possible.

It should be added that, at the beginning of the start of the face album, the mobile terminal could transfer several photographs of one person to the server after marking them according to the users' operations, and the server adjusts the predetermined clustering algorithm according to the marked photographs.

Figure 5A:
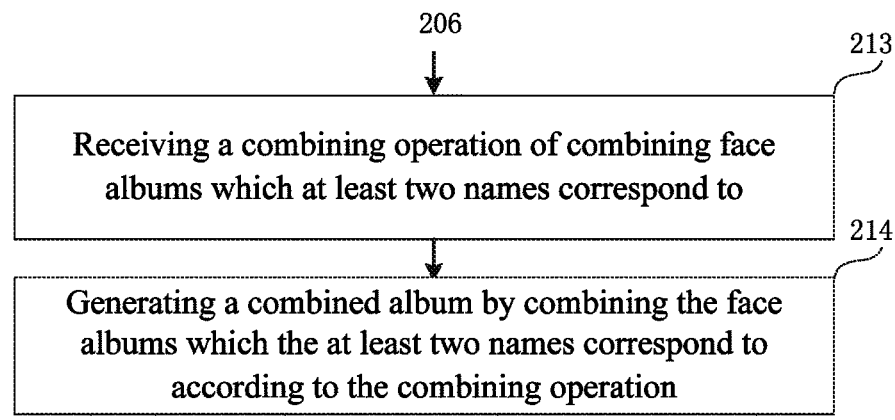
FIG. 5A is a flowchart of an album display method according to another exemplary embodiment.

Optionally, there might be a requirement from the user to combine at least two face albums, so the following steps are executed after step 206 as shown in FIG. 5A.

In Step 213, a combining operation of combining face albums at least two names correspond to is received. The combining operation can be triggered for the mobile terminal, when the user wants to combine the face albums the at least two names correspond to. The user could trigger a combining operation by adding another name into a face album.

In, Step 214, the combined album is generated by combining the face albums the at least two names correspond to according to the combining operation. According to the user's combining operation, the mobile terminal combines the face albums at least two names correspond to into a new combined album. The album identifier of the new combined album is automatically generated by the mobile terminal. The mobile terminal could still maintain the face albums not combined.

Figure 5B:
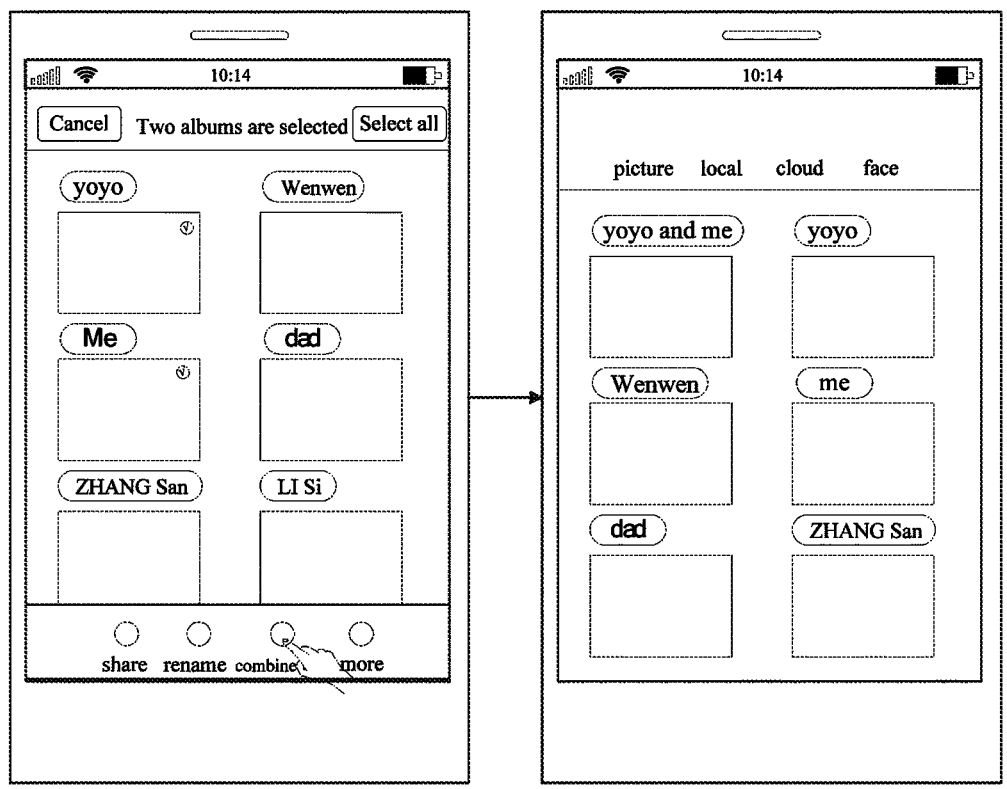
FIG. 5B is a diagram illustrating an interface of the album display method according to the exemplary embodiment illustrated by FIG. 5A.
Figure 6:
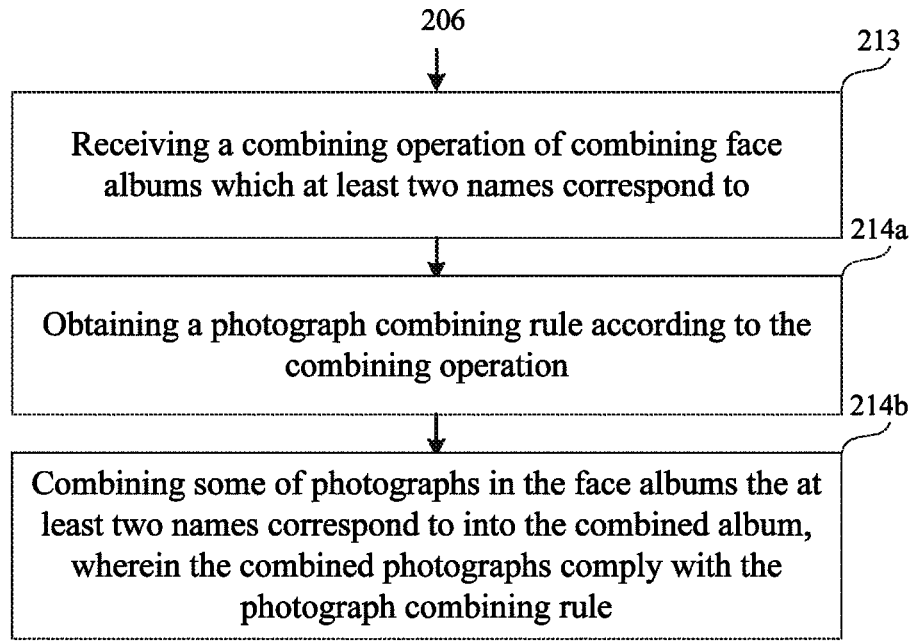
FIG. 6 is a flowchart of an album display method according to another exemplary embodiment.

For example, as shown in FIG. 5B, the user combines the face album "yoyo" and the face album "me" to generate a new combined album "yoyo and me". In case that the user has different requirements while combining the at least two albums, step 214 can be optionally replaced by step 214a and step 214b as shown in FIG. 6.

In Step 214a, the combining rule is obtained according to the combining operation. The user could optionally set the photograph combining rule while triggering the combining operation. The combining rule for adding a photograph into a combined album may be one of the following four:

1. A photograph contains a face at least one of the at least two names corresponds to; or,
2. A photograph contains faces all of the at least two names correspond to; or,
3. A photograph contains at least a face a designated one of the at least two names corresponds to; or,
4. A photograph contains only faces the at least two names corresponds to.

In Step 214b, some of photographs in face albums the at least two names correspond to are combined into the combined album. The combined photographs comply with the photograph combining rule. For example, the at least two names include name 1, name 2 and name 3. With respect to the first rule, a photograph is added into the combined album as long as it contains the face any one of the at least two names corresponds to. For example, a photograph is added into the combined album as long as it contains the face any one of name 1, name 2 and name 3 corresponds to.

With respect to the second rule, a photograph is added into the combined album only if the photograph contains faces corresponding to all of the at least two names. For example, a photograph is combined into the combined album only if it comprises faces of three persons having names 1-3 respectively. Certainly, the photograph may contain a face corresponding to another name.

With respect to the third rule, a photograph is added into the combined album only if it contains at least a face a designated one of the at least two names corresponds to. For example, a photograph is combined into the combined album only if it contains at least the faces corresponding to name 1 and name 2. Certainly, the photograph might contain name 3 or a face corresponding to another name.

With respect to the fourth rule, a photograph is added into the combined album, only if it contains only faces all of the at least two names correspond to. For example, a photograph is combined into the combined album only if it contains only faces of three persons having name 1, name 2, and name 3 respectively. The photograph cannot contain a face another name corresponds to.

To sum up, by providing the combined album customized by the user at the mobile terminal, the album display method according to this embodiment enables the user to generate combined albums from face albums of individual persons according to his/her own demands. Meanwhile, given the photograph combining rule, it is possible for the user to obtain combined albums rendered in different forms.

Figure 7:
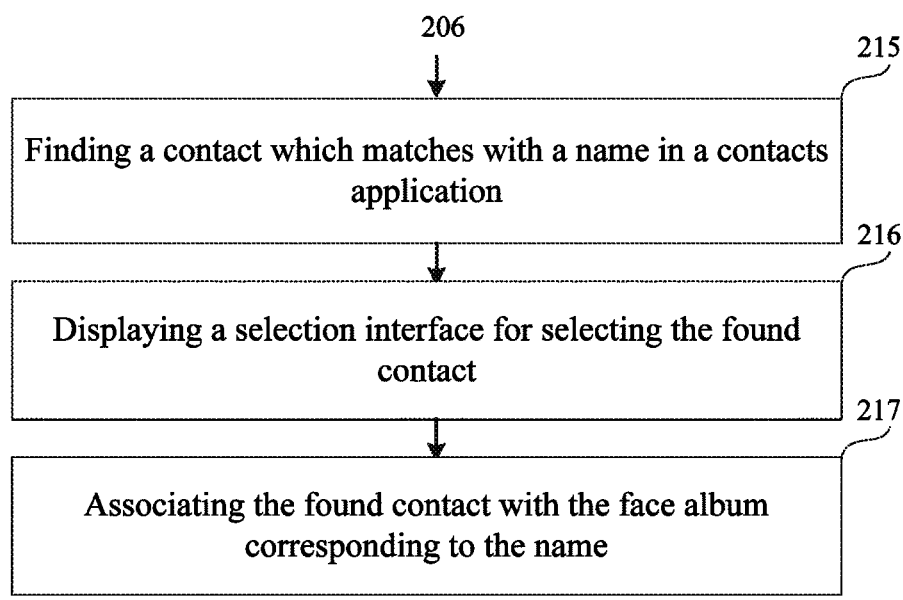
FIG. 7 is a flowchart of an album display method according to another exemplary embodiment.

The mobile terminal may associate the face album with a contacts application. The following steps are executed after step 206 as shown in FIG. 7.

In Step 215, a contact which matches with a name is found in the contacts application. For a face album corresponding to a name, the mobile terminal finds a contact which completely or partially matches with the name from the contacts application. The disclosed embodiment does not limit the type of the contacts application. Either a contacts application containing only the contacts function or a multifunctional application containing among others the contacts function can be considered as the contacts application.

For example, for the face album corresponding to "ZHANG San", the mobile terminal retrieves "ZHANG San", "third elder brother", "brother ZHANG" from the contacts application as contacts which match with the name.

In Step 216, a selection interface for selecting the found contact is displayed. The mobile terminal could display the selection interface for selecting the found contact. Correspondingly, the user could select one contact as the one matching with the name on the selection interface. For example, "third elder brother" is selected as the contact which matches with the name.

Figure 8A:
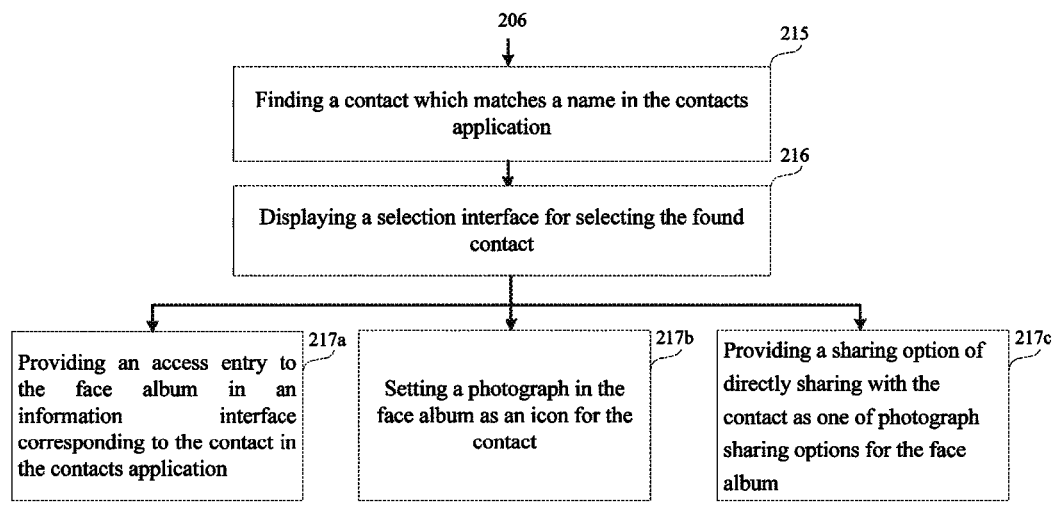
FIG. 8A is a flowchart of an album display method according to another exemplary embodiment.

In Step 217, the selected contact is associated with the face album the name corresponds to. The method adopted by the mobile terminal to associate the selected contact with the face album the name corresponds to may be any one of the following three, but is not limited thereto. That is to say, step 217 could be replaced by step 217a or step 217b or step 217c as shown in FIG. 8A.

Figure 8B:
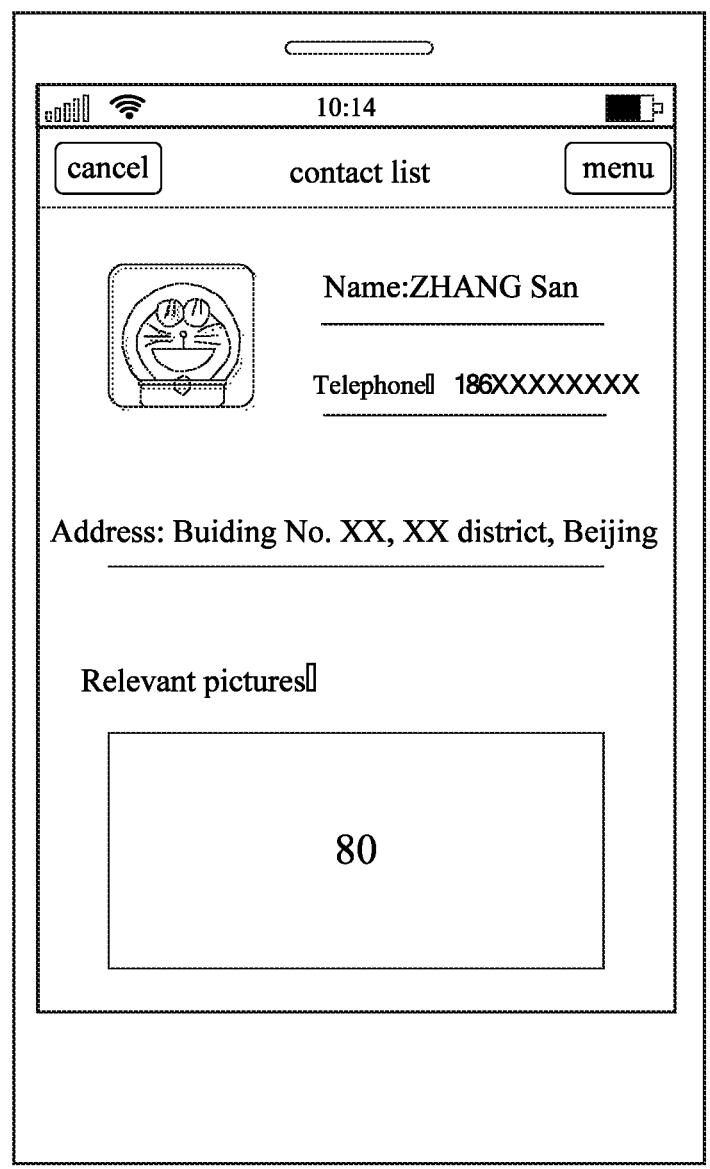
FIG. 8B is a diagram illustrating an interface of the album display method according to the exemplary embodiment illustrated by FIG. 8A.

In step 217a, an access entry for the face album is provided on an information interface of the contacts application which corresponds to the contact. As shown in FIG. 8B, the mobile terminal provides a shortcut button on the information interface for "third elder brother." The shortcut button is the access entry 80 for the face album corresponding to the name "ZHANG San".

In step 217b, a photograph in the face album is set as an icon of contact. The mobile terminal could set the cover photograph of the face album as the icon of the contact, or set one randomly selected photograph in the face album as the icon of the contact, or set a photograph selected by the user in the face album as the icon of the contact, or set the photograph taken recently in the face album as the icon of the contact, or generate a dynamic icon from the photographs in the face album as the icon of the contact.

In step 217c, an option of directly sharing photos with a contact is provided as one of photograph sharing options for the face album. The photograph sharing options provided by relevant techniques include: sharing via email, sending to my computer, sharing on micro blog, etc.

In addition to the above photograph sharing options, the present embodiment further provides sharing options such as directly sharing with the contact by mail, short message, instant communication account or application account for social contact.

To sum up, by associating a face album with the contacts application, the album display method provided in the embodiment achieves quick access to the face album, dynamic update of the contact icon and direct sharing of photographs, enabling cooperative execution, instead of independent execution, of the album program with other applications and making it more convenient for the user to use the face album or the contacts application. One person skilled in the art could implement other combinations based on the above embodiments, which will not be described herein any more.

The followings are apparatus embodiments according to the present disclosure, which can perform the method embodiments according to the present disclosure. Please refer to the method embodiments for details not given for the apparatus embodiments in the present disclosure.

Figure 9:
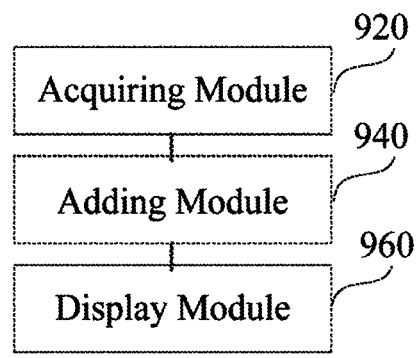
FIG. 9 is a block diagram of an album display apparatus according to another exemplary embodiment.

FIG. 9 is a block diagram of an album display apparatus according to one exemplary embodiment of the present disclosure. The album display apparatus could be implemented as a mobile terminal or a part of it by software, hardware or the combination thereof. The album display apparatus includes an acquiring module 920, an adding module 940 and a display module 960.

The acquiring module 920 is configured to obtain face identification information of N photographs from a server. The face identification information includes photograph identifiers and album identifiers of one or more face albums the photographs belong to, the face albums the photographs belong to being obtained by clustering the photographs based on similarity of faces in the photographs, and N being a positive integer. The adding module 940 is configured to add the N photographs to their corresponding face albums respectively according to the album identifier each photograph corresponds to. A display module 960 is configured to display the face albums.

To sum up, by clustering photographs based on faces in the photographs to obtain different face albums, the album display apparatus in the present embodiment enables photographs in the mobile terminal to be managed and displayed according to different faces. Accordingly, the problem in related techniques that an album program manages and displays photographs solely depending on sources, times or places of the pictures is addressed, and the effect that the album program could manage and display photographs according to faces is achieved.

Figure 10:
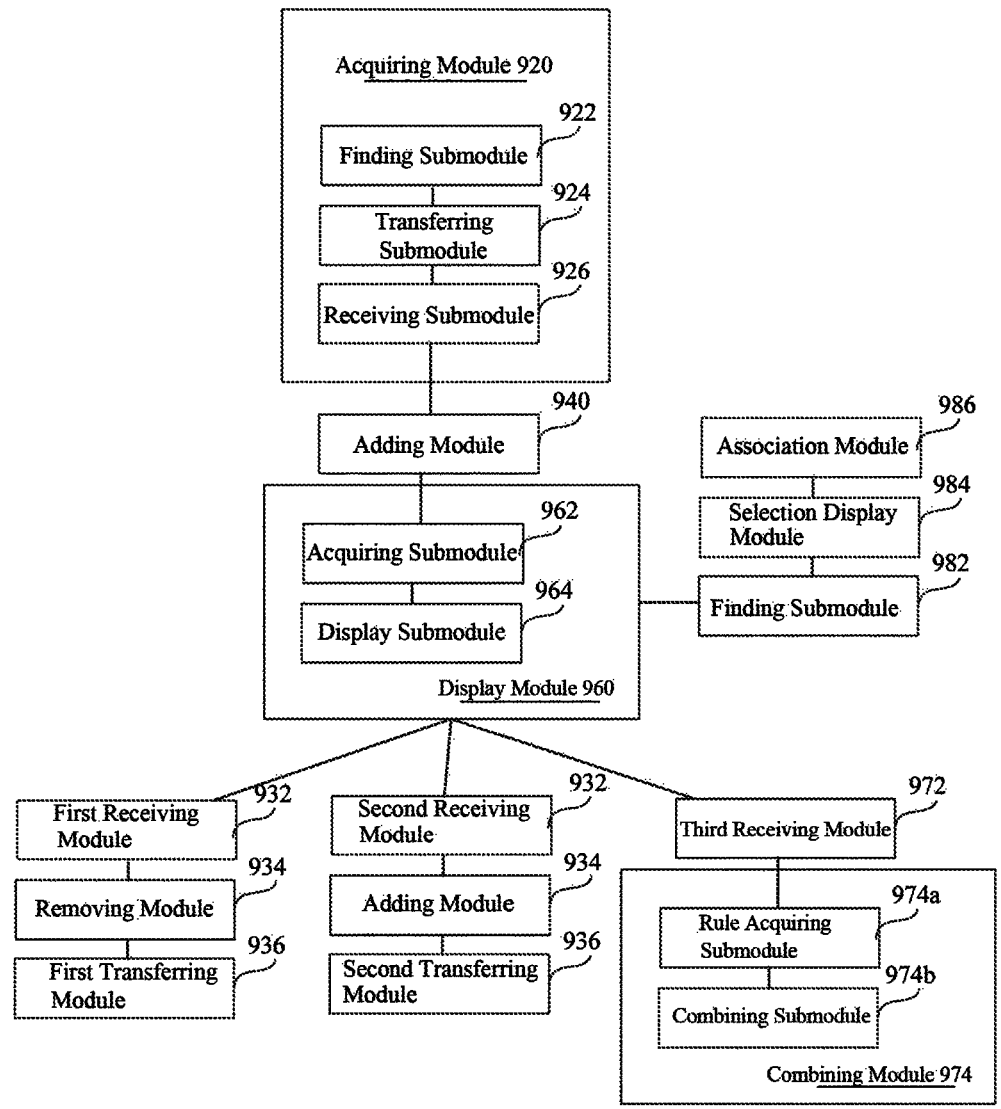
FIG. 10 is a block diagram of an album display apparatus according to another exemplary embodiment.

FIG. 10 is a block diagram of an album display apparatus according to another exemplary embodiment of the present disclosure. The album display apparatus could be implemented as a mobile terminal or a part of it by software, hardware or the combination thereof. The album display apparatus includes an acquiring module 920, an adding module 940 and a display module 960.

The acquiring module 920 is configured to acquire face identification information of N photographs from a server. The face identification information includes photograph identifiers and album identifiers of one or more face albums the photographs belong to. The face albums the photographs belong to are obtained by clustering the faces in photographs based on similarity, and N is a positive integer. The adding module 940 is configured to add the N photographs to their corresponding face album respectively according to the album identifier each photograph corresponds to. The display module 960 is configured to display the face albums.

Optionally, the acquiring module 920 includes a finding submodule 922, a transferring submodule 924, and a receiving submodule 926. The finding submodule 922 is configured to find N photographs for which face identification information does not exist from stored photographs. The transferring submodule 924 is configured to transfer the found N photographs to the server. The server performs face identification for the N photographs and clusters the photographs based on identified faces according to a predetermined clustering algorithm, so as to obtain the face albums the photographs belong to and the album identifiers of the face albums. The receiving submodule 926 is configured to receive the face identification information transferred from the server. The face identification information may further include a face identifier each face in the photographs corresponds to.

The apparatus further includes a first receiving module 932, a removing module 934, and a first transferring module 936. The first receiving module 932 is configured to receive a removing operation of removing the first photograph from a first face album which the first photograph belongs to. The first photograph is one of the N photographs, and the first face album is one of the face albums. The removing module 934 is configured to remove the first photograph from the first face album and delete an association between an association face identifier of the first photograph and an album identifier of the first face album. The association face identifier is a face identifier of a face by which the server clusters the first photograph into the first face album. The first transferring module 936 is configured to transfer a photograph identifier of the first photograph and removing information to the server. The removing information represents the deletion of the association between the face association identifier and the album identifier of the first face album, and the server adjusts the predetermined clustering algorithm according to the photograph identifier of the first photograph and the removing information. The face identification information may further include a face identifier each face in the photographs corresponds to.

The apparatus further includes a second receiving module 952, an adding module 954, and a second transferring module 956. The second receiving module 952 is configured to receive an adding operation of adding a second photograph to a second face album. The second face album is one of the face albums. The adding module 954 is configured to add the second photograph to the second face album and establish an association between a face identifier of the second photograph and an album identifier of the second face album. The second transferring module 956 is configured to transfer a photograph identifier of the second photograph and adding information to the server. The adding information represents the establishing of the association between the face identifier of the second photograph and the album identifier of the second face album, and the server adjusts the predetermined clustering algorithm according to the photograph identifier of the second photograph and the adding information.

The display module 960 may further includes a receiving submodule 962 configured to acquire a name each face album corresponds to and a display submodule 964 configured to display the name as attribute information of the face album.

The apparatus may further includes a third receiving module 972 configured to receive a combining operation of combining face albums at least two names correspond to, and a combining module 974 configured to combine the face albums at least two names correspond to according to the combining operation, so as to generate combined album.

Optionally, the combining module 974 includes a rule acquiring submodule 974a configured to acquire a photograph combining rule according to the combining operation, and a combining submodule 974b configured to combine some of photographs in the face albums the at least two names correspond to into the combined album. The combined photographs conform to the combining rule. The photograph combining rule requires each of the photographs to: contain a face at least one of the at least two names corresponds to, or, contain faces all of the at least two names correspond to, or at least contain a face a designated one of the at least two names corresponds to, or only contain faces the at least two names correspond to.

The apparatus may further include a finding module 982 configured to find a contact matching with a name in a contacts application, a selection displaying module 984 configured to display a selection interface for selecting the found contact, and an associating module 986 configured to associate the selected contact with the face album the name corresponds to.

The associating module 986 is configured to: provide an access entry for the face album, in an information interface of the contacts application which corresponds to the contact, or set a photograph in the face album as an icon for the contact, or provide a sharing option of directly sharing with the contact as one of photograph sharing options for the face album.

Specific operations of the various modules of the apparatus in above embodiments have been described in detail in the related method embodiments, and will not be described herein in detail.

One exemplary embodiment in the present disclosure provides an album display apparatus, whereby the album display method in the present disclosure can be implemented. The album display apparatus comprises: a processor and a memory for storing commands executable by the processor to upload a plurality of photographs stored in the album display apparatus to a server, receive face identification information for each of the plurality of photographs from the server, the face identification information includes a photograph identifier and an album identifier for one of a plurality of face albums the photographs, and the plurality of face albums are generated by grouping the plurality of photographs based on faces identified in the plurality of photographs, add the plurality of photographs to their corresponding face albums based on the face identification information, and display the plurality of face albums.

Figure 11:
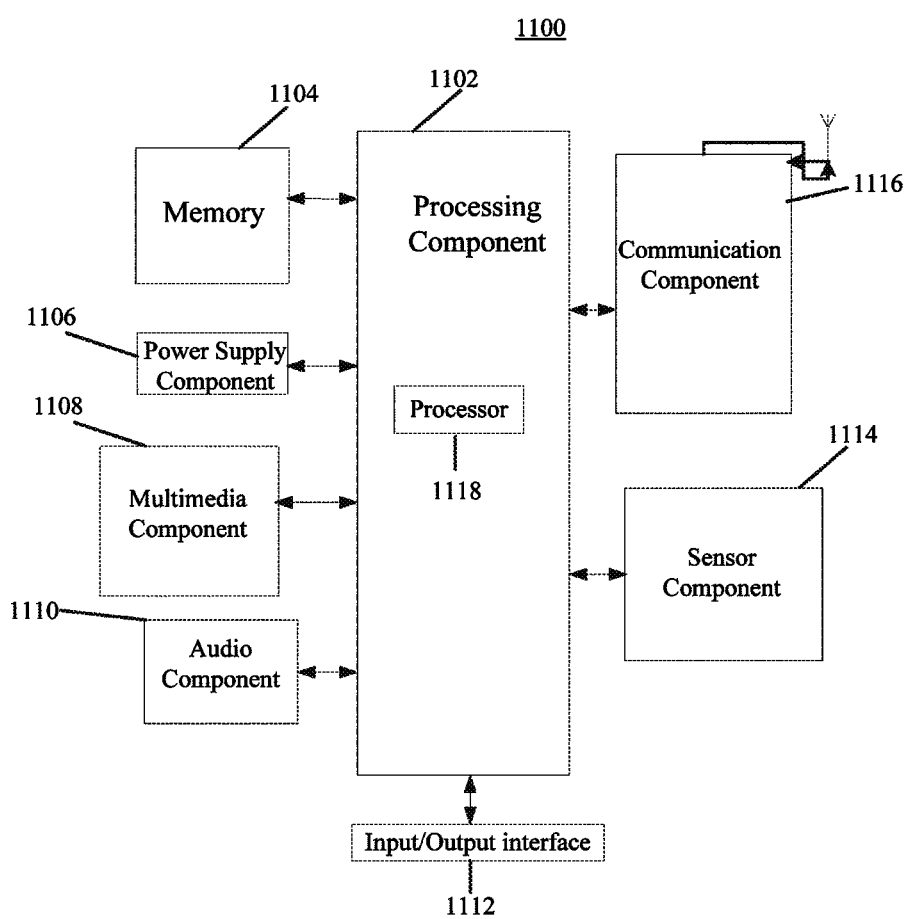
FIG. 11 is a block diagram of an album display apparatus according to another exemplary embodiment.

FIG. 11 is a block program of an album display apparatus according to one exemplary embodiment. For example, the apparatus 1100 can be a mobile phone, a computer, a digital broadcasting terminal, a message receiving and sending equipment, a game console, a tablet device, medical equipment, exercise equipment, a personal digital assistant or the like.

With reference to FIG. 11, the apparatus 1100 comprises one or more components of the following: a processing component 1102, a memory 1104, a power supply component 1106, a multimedia component 1108, an audio component 1110, an input/output (I/O) interface 1112, a sensor component 1114, and a communication component 1116.

The processing module 1102 normally controls overall operations of the apparatus 1100, such as the operations associated with display, phone call, data communication, camera operation and recording operation. The processing module 1102 can comprise one or more processors 1118 for executing commands, so as to perform all or part of the steps of the above-described methods. In addition, the processor module 1102 includes one or more modules for facilitating the interaction between the processing module 1102 and other modules. For example, the processing module 1102 includes a multimedia module for facilitating the interaction between the multimedia component 1108 and the processing component 1102.

The memory 1104 is configured to store various kinds of data for supporting the operation in the apparatus. The specific examples of these data include commands for any applications or methods operated on the apparatus 1100, contact data, data of telephone book, messages, pictures, videos and so on. The memory 1104 can be implemented by any kind of volatile or non-volatile storage device or the combination thereof, such as static random access memory (SRAM), electrically-erasable programmable ROM (EPROM), programmable read only memory (PROM), read only memory (ROM), magnetic memory, flash memory, magnetic disk or compact disk.

The power supply component 1106 supplies power to various components of the apparatus 1100. The power supply component 1106 may comprise a power management system, one or more power sources, and other related components which generate, mange or distribute power for the apparatus 1100.

The multimedia component 1108 comprises a screen which provides an output interface between the apparatus 1100 and the user. In some embodiments, the screen could comprise the liquid crystal display (LCD) and touch panel (TP). If the screen comprises the touch panel, the screen can be implemented as a touch screen for receiving input signals from the user. The touch panel comprises one or more touch sensors for sensing touch, sliding and gestures on the touch panel. The touch sensor can not only sense the boundary of touch or sliding movement, but also detects the duration time and pressure related to touch or sliding operations. In some embodiments, the multimedia component 1108 comprises a front facing camera and/or a rear camera. When the apparatus 1100 is in the operation mode, such as image capturing mode or video mode, the front facing camera and/or rear camera can receive the external multimedia data. Each front facing camera and rear camera can be a fixed optical lens system or has the focal length and optical zoom ability.

The audio component 110 is configured to output and/or input audio signals. For example, the audio component 1110 includes a microphone (MIC), which is configured to receive the external audio signal when the apparatus 1100 is in an operation mode such as calling mode, recording mode and voice identification mode. The received audio signal can be further stored in memory 1104 or transferred through the communication component 1116. In some embodiments, the audio component 1110 comprises a speaker for outputting the audio signals.

I/O interface 1112 provides an interface between the processing component 1102 and peripheral interface modules, such as keyboard, click wheel, button, etc. The buttons may include but are not limited to the home button, voice volume button, starting button and locking button.

The sensor component 114 comprises one or more sensors for providing status evaluations on various aspects of the apparatus 1100. For example, the sensor component 1114 can detect the open/close status of the device 1100, and the relative positioning of the components, for example, display and keypad of the apparatus 1100. The sensor component 1114 can further detects a change in position of the apparatus 1100 or one component of the apparatus 1100, the existence or non-existence of the contact between the user and the apparatus 1100, location or accelerating/reducing speed of the apparatus 1100, and a change in temperature of the apparatus 1100. The sensor component 1114 comprises a proximity sensor configured for detecting the existence of the nearby objects without any physical contact. The sensor component 1114 comprises an optical sensor, such as CMOS or CCD image sensor for use in the imaging application. In some embodiments, the sensor component 1114 comprises the acceleration sensor, Gyro sensor, magnetic sensor, pressure sensor or temperature sensor.

The communication component 1116 is configured for facilitating wired or wireless communication between the apparatus 1100 and other apparatuses. The apparatus 1100 can be connected into the wireless network based on a communication standard, such as Wi-Fi, 2G or 3G, or the combination thereof. In an exemplary embodiment, the communication component 1116 receives the broadcasting signal or the information related to the broadcasting from the external broadcasting management system through the broadcasting channel. In one exemplary embodiment, the communication component 1116 comprises the near field communication (NFC) module for promoting the short-range communication, which for example, can be accomplished in the NFC module based on the radio frequency identification (RFID) technique, infra-red data association (IrDA) technique, ultra-wideband (UWB) technique, Bluetooth (BT) technique and other techniques.

In the exemplary embodiment, the device 1100 can be implemented by one or more application specific integrated circuit (ASIC), digital signal processor (DSP), programmable logic device (PLD), field-programmable gate array (FPGA), controller, microcontroller, microprocessor or other electric elements, so as to execute the album display method.

In the exemplary embodiments, a non-transitory computer readable storage medium comprising commands is provided, such as the memory 1104 including commands. The commands can be executed by the processor 1118 of the apparatus 1100 so as to implement the above-described album display methods. For example, the non-transitory computer readable storage medium can be ROM, random access memory (RAM), CD-ROM, magnetic tape, floppy disk and optical data storage devices.

Each module discussed above, such as the acquiring module 920, the adding module 940 and the display module 960, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example.

Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for displaying albums on a smart device, comprising:
   uploading, by a smart device, a plurality of photographs stored in the smart device to a server;
   receiving, by the smart device, face identification information for at least two photographs of the plurality of photographs from the server, wherein the at least two photographs are identified to include faces by the server using a face recognition algorithm, the face identification information includes a photograph identifier, a face identifier for each face in a given photograph, and an album identifier for one of a plurality of face albums, whereby the plurality of face albums are generated by grouping the at least two photographs based on faces identified in the at least two photographs;

adding, by the smart device, the at least two photographs to their corresponding face albums based on the face identification information;

displaying, by the smart device, the plurality of face albums on the smart device;

receiving, by the smart device from a user, an instruction for removing a first photograph from a first face album which the first photograph belongs to, wherein the first photograph is one of the at least two photographs and the first face album is one of the face albums;

in response to the instruction, removing, by the smart device, the first photograph from the first face album and deleting an association between an association face identifier of the first photograph and an album identifier of the first face album, wherein the association face identifier is a face identifier of a face by which the server groups the first photograph into the first face album; and transferring, by the smart device, a photograph identifier of the first photograph and removing information to the server, wherein the removing information includes information on the deletion of the association between the association face identifier and the album identifier of the first face album, and the server adjusts the predetermined clustering algorithm based on the photograph identifier of the first photograph and the removing information.

2. A method for displaying albums on a smart device, comprising:

uploading, by a smart device, a plurality of photographs stored in the smart device to a server;

receiving, by the smart device, face identification information for at least two photographs of the plurality of photographs from the server, wherein the at least two photographs are identified to include faces by the server using a face recognition algorithm, the face identification information includes a photograph identifier and an album identifier for one of a plurality of face albums, whereby the plurality of face albums are generated by grouping the at least two photographs based on faces identified in the at least two photographs according to a predetermined clustering algorithm, wherein the face identification information further comprises a face identifier for each face in photographs;

adding, by the smart device, the at least two photographs to their corresponding face albums based on the face identification information;

displaying, by the smart device, the plurality of face albums on the smart device;

receiving, from a user, an instruction for adding a second photograph to a second face album, wherein the second face album is one of the face albums;

in response to the instruction, adding the second photograph to the second face album and establishing an association between a face identifier of the second photograph and an album identifier of the second face album; and uploading a photograph identifier of the second photograph and adding information to the server, wherein the adding information includes information on the association between the face identifier of the second photograph and the album identifier of the second face album, and the server adjusts the predetermined clustering algorithm based on the photograph identifier of the second photograph and the adding information.

3. The method according to claim 2, wherein said displaying the face albums comprises:

obtaining a name related to each face album; and displaying the name along with the face album on a screen of the smart device.

4. The method according to claim 3, wherein the method further comprises:

receiving, from a user, an instruction for combining two or more face albums; and generating a combined album by combining photographs of the two or more face albums in response to the instruction.

5. The method according to claim 4, wherein generating a combined album by combining photographs of the two or more face albums comprises:

selecting one or more photographs that meet a predetermined combining rule from the two or more face albums; and generating a combined album including the one or more photographs.

6. The method according to claim 3, further comprising:

searching for a contact matching with the name in a contacts application; and associating the contact with the face album corresponding to the name.

7. The method according to claim 6, wherein said associating the contact with the face album corresponding to the name comprises:

providing an access entry to the face album on an interface displaying the contact in the contacts application.

8. The method according to claim 6, wherein said associating the contact with the face album corresponding to the name comprises:

setting a photograph in the face album as an icon for the contact in the contacts application.

9. The method according to claim 6, wherein said associating the contact with the face album corresponding to the name comprises:

providing an option of sharing the face album with the contact when displaying the face album on the smart device.

10. An album display apparatus, comprising:

a processor; and a memory for storing commands executable by the processor, wherein, when the processor executes the commands, the processor is configured to cause the album display apparatus to:

upload a plurality of photographs stored in the album display apparatus to a server;

receive face identification information for at least two photographs of the plurality of photographs from the server, wherein the at least two photographs are identified to include faces by the server using a face recognition algorithm, and the face identification information includes a photograph identifier and an album identifier for one of a plurality of face albums, whereby the plurality of face albums are generated by grouping the at least two photographs based on faces identified in the at least two photographs according to a predetermined clustering algorithm, wherein the face identification information further comprises a face identifier for each face in the photographs;

add the at least two photographs to their face albums based on the face identification information;

display the plurality of face albums on the album display apparatus;

receive an instruction for removing a first photograph from a first face album which the first photograph belongs to, wherein the first photograph is one of the at least two photographs and the first face album is one of the face albums;

remove, in response to the instruction, the first photograph from the first face album and deleting an association between an association face identifier of the first photograph and an album identifier of the first face album, wherein the association face identifier is a face identifier of a face by which the server groups the first photograph into the first face album; and transfer a photograph identifier of the first photograph and removing information to the server, wherein the removing information includes information on the deletion of the association between the association face identifier and the album identifier of the first face album, and the server adjusts the predetermined clustering algorithm based on the photograph identifier of the first photograph and the removing information.

11. An apparatus, comprising:

a processor; and a memory for storing commands executable by the processor, wherein, when the processor executes the commands, the processor is configured to cause the album display apparatus to:

upload a plurality of photographs stored in the album display apparatus to a server;

receive face identification information for at least two photographs of the plurality of photographs from the server, wherein the at least two photographs are identified to include faces by the server using a face recognition algorithm, and the face identification information includes a photograph identifier and an album identifier for one of a plurality of face albums, whereby the plurality of face albums are generated by grouping the at least two photographs based on faces identified in the at least two photographs according to a predetermined clustering algorithm, wherein the face identification information further comprises a face identifier for each face in the photographs;

add the at least two photographs to their face albums based on the face identification information;

display the plurality of face albums on the album display apparatus;

receive an instruction for adding operation of adding a second photograph to a second face album, wherein the second face album is one of the face albums;

add, in response to the instruction, the second photograph to the second face album and establishing an association between a face identifier of the second photograph and an album identifier of the second face album; and upload a photograph identifier of the second photograph and adding information to the server, wherein the adding information includes information on the association between the face identifier of the second photograph and the album identifier of the second face album, and the server adjusts the predetermined clustering algorithm based on the photograph identifier of the second photograph and the adding information.

12. The apparatus according to claim 11, wherein the processor is also configured to:

obtain a name corresponding to each face album; and display the name along with the face album on a screen of the apparatus.

13. The apparatus according to claim 12, wherein the processor is also configured to:

receive an instruction for combining two or more face albums; and generate a combined album by combining photographs of the two or more face albums in response to the instruction.

14. The apparatus according to claim 12, wherein the processor is also configured to:

search for a contact matching with the name in a contacts application; and associate the contact with the face album corresponding to the name.

15. The apparatus according to claim 14, wherein the processor is also configured to:

provide an access entry to the face album on an interface displaying the contact in the contacts application.

* * * * *